United States Patent
Völker et al.

(10) Patent No.: US 10,718,353 B2
(45) Date of Patent: Jul. 21, 2020

(54) GEARBOX WITH A SHAFT

(71) Applicant: SEW-EURODRIVE GMBH & CO. KG, Bruchsal (DE)

(72) Inventors: Konstantin Völker, Bruchsal (DE); Peter Barton, Bretten (DE); Stefan Dietrich, Karlsruhe (DE); Anette Bunka, Eggenstein-Leopoldshafen (DE)

(73) Assignee: SEW-EURODRIVE GMBH & CO.KG, Bruchsal (DE)

( * ) Notice: Subject to any disclaimer, the term of this patent is extended or adjusted under 35 U.S.C. 154(b) by 756 days.

(21) Appl. No.: 14/780,790

(22) PCT Filed: Feb. 12, 2014

(86) PCT No.: PCT/EP2014/000382
§ 371 (c)(1),
(2) Date: Sep. 28, 2015

(87) PCT Pub. No.: WO2014/154316
PCT Pub. Date: Oct. 2, 2014

(65) Prior Publication Data
US 2016/0053775 A1    Feb. 25, 2016

(30) Foreign Application Priority Data

Mar. 28, 2013  (DE) .................. 10 2013 005 430

(51) Int. Cl.
*F04D 29/58* (2006.01)
*F16H 57/04* (2010.01)
(Continued)

(52) U.S. Cl.
CPC ......... *F04D 29/5806* (2013.01); *F04D 17/06* (2013.01); *F04D 17/08* (2013.01);
(Continued)

(58) Field of Classification Search
CPC ........... F04D 17/16; F04D 17/06; F04D 17/08
See application file for complete search history.

(56) References Cited

U.S. PATENT DOCUMENTS

| 3,692,428 A | * | 9/1972 | Bubb | ................ F04D 29/282 416/187 |
| 5,755,555 A | | 5/1998 | Swift | |

(Continued)

FOREIGN PATENT DOCUMENTS

| CN | 202031881 U | 11/2011 |
| DE | 10 2005 031 197 | 1/2007 |

(Continued)

OTHER PUBLICATIONS

International Search Report, dated May 8, 2014, issued in corresponding International Application No. PCT/EP2014/000382.
(Continued)

*Primary Examiner* — Woody A Lee, Jr.
*Assistant Examiner* — Michael L Sehn
(74) *Attorney, Agent, or Firm* — Hunton Andrews Kurth LLP (57) ABSTRACT

A gear unit having a shaft, in particular an input shaft, a fan impeller being connected to the shaft in a torsionally fixed manner, a fan hood being connected to the gear unit housing, which at least partially encloses the fan impeller, a separation plate for separating the pressure chamber of the fan from the suction chamber of the fan being connected to the fan hood, where the separation plate has an air intake opening for the fan impeller and is situated on the side of the fan impeller facing axially away from the gear unit, the fan impeller has an upper and a lower cover disk, which are axially set apart from each other, and fan blades are disposed between the cover disks, so that channels are formed, the radial clearance of the air intake opening being disposed within, especially centrally within, the radial clearance
(Continued)

region covered by the upper cover disk, and the air intake opening is disposed axially within, especially centrally within, the axial region covered by the upper cover disk.

18 Claims, 7 Drawing Sheets

(51) Int. Cl.
*F04D 17/06* (2006.01)
*F04D 17/08* (2006.01)
*F04D 25/02* (2006.01)
*F04D 29/053* (2006.01)
*F04D 29/28* (2006.01)
*F04D 29/42* (2006.01)

(52) U.S. Cl.
CPC ......... *F04D 25/028* (2013.01); *F04D 29/053* (2013.01); *F04D 29/281* (2013.01); *F04D 29/4206* (2013.01); *F04D 29/582* (2013.01); *F16H 57/0416* (2013.01)

(56) References Cited

U.S. PATENT DOCUMENTS

| | | |
|---|---|---|
| 7,827,878 B2 | 11/2010 | Langer |
| 8,833,193 B2 | 9/2014 | Strauss et al. |
| 2015/0192197 A1 | 7/2015 | Volker et al. |

FOREIGN PATENT DOCUMENTS

| | | |
|---|---|---|
| DE | 10 2007 008 658 | 8/2008 |
| DE | 10 2007 009 366 | 8/2008 |
| EP | 2 020 536 | 2/2009 |
| GB | 2 282 206 | 3/1995 |
| JP | 08-105521 | 4/1996 |
| JP | 10-61754 | 3/1998 |
| WO | 2010/108598 | 9/2010 |
| WO | 2014/005666 | 1/2014 |

OTHER PUBLICATIONS

International Preliminary Report on Patentability, dated Oct. 8, 2015, issued in corresponding International Application No. PCT/EP2014/000382.

* cited by examiner

GEARBOX WITH A SHAFT

FIELD OF THE INVENTION

The present invention relates to a gear unit having a shaft.

BACKGROUND INFORMATION

A fan impeller featuring a jet effect is described in German Published Patent Appln. No. 10 2007 009 366.

From German Published Patent Appln. No. 10 2005 031 197, a fan is described in which the incoming flow is shifted to a surface that is inclined by 30°.

Described in German Published Patent Appln. No. 10 2007 008 658 as the most proximate related art is a gear unit in which a fan impeller on a shaft is connected to the shaft in a torsionally fixed manner, and the fan hood includes a side wall that has an opening to allow air to enter.

A gear unit housing is described in British Published Patent Appln. No. 2 282 206, where a fan impeller is connected to a shaft, and a fan hood includes a sheet-metal part that extends radially toward the inside and is provided with an opening.

Japanese Laid-Open Application No. 8 105 521, on the other hand, describes connecting a fan impeller to a shaft in a torsionally fixed manner, the fan hood having a side wall that extends radially toward the inside and has an opening.

An air-cooled gear unit is also described in Japanese Laid-Open Application No. 10 061 754.

A fan impeller is described in U.S. Pat. No. 5,755,555.

SUMMARY

Therefore, the present invention is based on the objective of further developing a gear unit having a shaft in the most compact manner possible, i.e., to enable the highest possible output at the lowest possible volume.

Important features of the invention in the gear unit having a shaft, especially an input shaft, are that a fan impeller is connected to the shaft in a torsionally fixed manner, and a fan hood, which surrounds the impeller fan at least partially, is connected at the gear unit housing, a separation plate for separating the pressure chamber of the fan from the suction chamber of the fan is connected to the fan hood, the separation plate has an air intake opening for the fan impeller and is situated on the side of the fan impeller that faces axially away from the gear unit.

This has the advantage that the pressure chamber is separated from the suction chamber by a simple thin and cost-effective sheet metal part, in particular a steel plate. Especially effective cooling of the gear unit is therefore possible, since reverse turbulence or a recirculation of the airflow supplied by the fan is prevented.

Specifically, the fan includes a fan impeller which has an upper and a lower cover disk which are axially set apart from one another, and fan blades of the fan impeller are situated between the cover disks, the separation plate has an air intake opening for the fan impeller and is situated on the side of a cover disk of the fan impeller facing axially away from the gear unit. This is advantageous insofar as the air is guided in channels of the fan impeller, the channels being formed by the fan blades and the cover disks. In addition, the air intake through the centrally situated opening in the separation plate is able to be implemented in such a way that the air is supplied directly into the channels of the fan impeller and the lowest possible turbulence and turbulence losses are produced in the intake region. The opening in the separation plate essentially corresponds to the opening diameter of the air intake of the fan impeller facing the separation plate.

In one advantageous development, the fan impeller is a radial fan impeller, the fan blades of the fan impeller in particular being spaced apart from each other at irregular intervals in the circumferential direction. This has the advantage that a fan impeller which operates in an energy-efficient manner and features only low noise development is able to be used.

In one advantageous development the separation plate is connected to the fan hood in a reversible manner. This is advantageous insofar as an exchange of the separation plate makes it possible to optionally provide fan impellers of different sizes in the fan hood.

In one advantageous development, the separation plate abuts the fan impeller, and a clearance is provided, which prevents contact between the separation plate and the fan impeller but does not permit any essential return flow from the pressure chamber into the suction chamber. This is advantageous insofar as no frictional losses occur but no return flow of the supplied air flow takes place.

In one advantageous development, the fan hood and/or the gear unit housing have/has a rectangular shape and/or the outer diameter of the fan impeller is greater than the width of the gear unit housing and/or is smaller than the height of the gear unit housing. This is advantageous inasmuch as the supplied air flow can be guided along the gear unit housing.

In one advantageous development, air baffles for preventing or reducing turbulence in the air flow exiting the fan hood are situated between the fan hood and the gear unit housing, the air baffles being axially set apart from the fan impeller, especially at a clearance h1. This has the advantage that an air flow that features the lowest turbulence possible emergences from the fan or at least from the fan hood surrounding the fan.

In one advantageous development, the fan hood is developed as a nozzle in the exit region of the air, so that an emerging air flow is flowing along the gear unit housing, which advantageously increases the exit speed.

In one advantageous development, a cover plate is axially set apart from the separation plate, so that the air enters from the radial direction, the cover plate in particular having recesses to enable an additional axially entering air flow. This has the advantage that air enters essentially uniformly from all angles at circumference.

In one advantageous development the fan hood, in particular the fan hood including the separation plate, is developed as a punched and bent component, the nozzle in particular being implemented by placing a fan hood edge in the air exit region, the setting angle being between 10° and 40°, in particular. The advantage in this regard is that the production of the nozzle can be carried out in a simple manner, especially by bending. The indicated angular range allows the most energy-efficient increase in speed possible.

In one advantageous development, the outer radius of the fan impeller is greater than the width of the gear unit and smaller than the height of the gear unit, which has the advantage that the emerging air flow emerges along the sides of the gear unit.

In other exemplary embodiments according to the present invention, a fan impeller is optionally installed, the outer radius of the fan impeller being smaller than the width of the gear unit and smaller than the height of the gear unit. In this case, the radius of the opening of the separation plate is once again developed correspondingly small, i.e., at the outer radius of the air intake region of the fan impeller formed by the channels of the fan impeller.

In one advantageous development, the air baffles extend radially from the gear unit housing to the fan hood, which has the advantage of achieving a simple anti-turbulence effect. In addition, the air baffles may have a planar design in each case and have very thin walls, so that an essentially purely radial extension suffices.

In one advantageous development, the fan impeller has an upper and a lower cover disk which are axially set apart from each other, and fan blades are situated between the cover disks, so that channels are formed, the channel cross-section increases monotonously from the intake region at the fan impeller, which lies further inward, in the direction of the exit region at the fan impeller, which lies further radially outside, the intake region in particular being implemented at an axial position, i.e., the intake area in particular being an area that extends only radially and in the circumferential direction, and the exit area being an area that extends in the radial direction, in the circumferential direction, and in the axial direction. This has the advantage that a diffuser effect is able to be realized and the fan induces a conveying effect nevertheless. The air is therefore carried radially toward the outside on the one hand, and high pressure is generated on the other. A high exit speed in the air exiting from the fan hood is thus achievable with the aid of the nozzle, which converts the pressure generated by the fan into a high exit speed. In addition, the air flow supplied radially toward the outside has an axial component because the exit area surface extends in all three directions. In other words, the exit area surface of the fan impeller simplifies a deflection of the radially supplied air flow into the axial direction, the fan hood exerting an additional effect for the complete deflection in the axial direction.

In one advantageous refinement, at least one of the cover disks has a conical shape. This has the advantage of achieving a weak diffuser effect, i.e., the correspondingly small increase in the channel cross-section radially toward the outside, is able to be achieved in an uncomplicated manner.

Further advantages are derived from the dependent claims. The present invention is not restricted to the feature combination of the claims. Those skilled in the art will discover additional meaningful possibilities for combining the claims and/or individual claim features and/or features of the specification and/or of the figures, that arise from the stated objective and/or the objective resulting from a comparison with the related art, in particular.

DETAILED DESCRIPTION

As shown in the Figures, a fan 5 is connected on input shaft 8 of gear unit 6 in a torsionally fixed manner. A fan hood 9, which surrounds fan 5, is situated on the gear unit housing.

The gear unit is developed as a bevel gear drive, which is why input shaft 8 is supported in a conical pot housing component 11 connected to the housing of gear unit 6.

Fan 5 includes a radial fan impeller, whose fan blades 7 extend radially, in particular exclusively radially. This allows an air supply that is independent of the direction of rotation.

Figure 6:
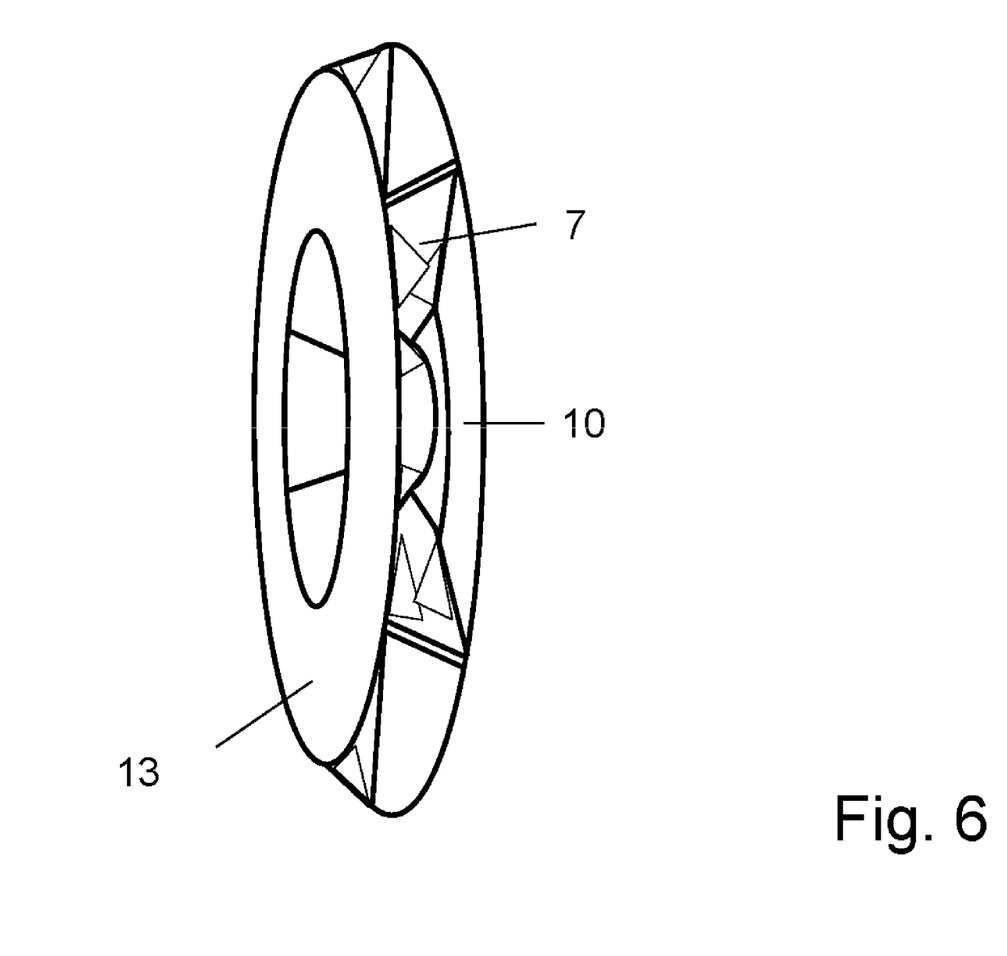
FIG. 6 shows an oblique view of fan 5 from another direction of view.

As shown in FIG. 6, radial fan impeller has an upper cover disk 10 and a lower cover disk 13, between which air blades 7 are situated. Upper cover disk 10 and lower cover disk 13 are therefore axially spaced apart from each other. Air blades 7 cover the axial interspace between upper and lower cover disks 10, 13.

Fan hood 9 has a separation plate 1, which extends in the radial direction and is situated at an axial position disposed on the side that is axially facing away from the gear unit having conical pot housing component 11. Separation plate 1 is provided with a centrally situated opening, so that the air is entering from the radial direction. However, the opening in separation plate 1 is so small that the entering air does not reach the outer edge of the fan impeller. The inner diameter of the opening of separation plate 1 is smaller than the maximum outer diameter of fan 5 for this purpose.

By placing fan 5 on the input shaft of the gear unit developed as reduction gears, fan 5 is situated on the shaft that is rotating most rapidly, i.e., on input shaft 8.

Fan hood 9 deflects the air flow supplied by fan 5 from the radial into the axial direction. A nozzle 3, and thus an increased exit speed in the axial exit region, is achieved with the aid of means that cause a restriction.

The exit openings of fan hood 9 are disposed on its side facing away from the input in such a way that the emerging air flow is flowing along the gear unit housing.

Figure 3:
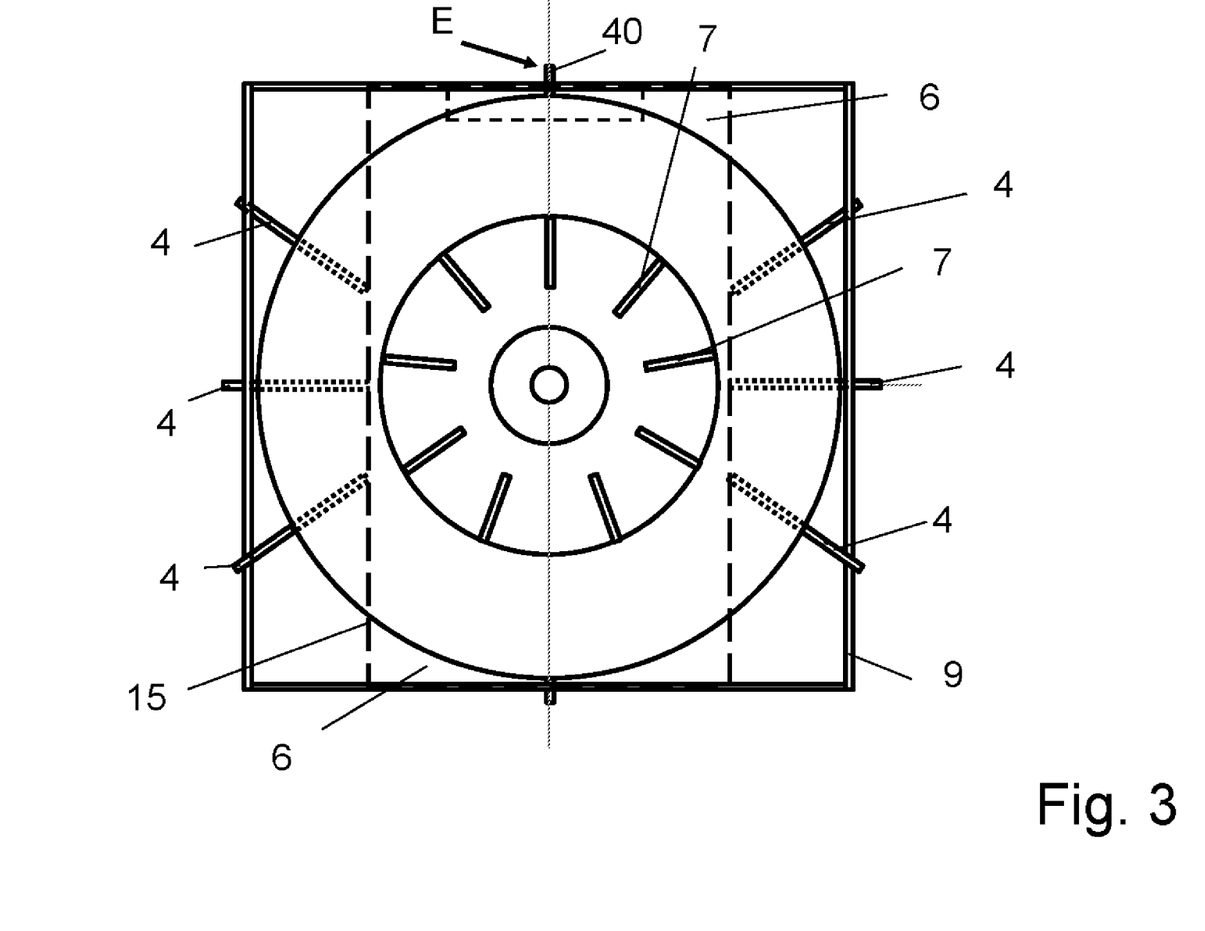
FIG. 3 shows a view in the axial direction.

However, as can be gathered from the plan view of FIG. 3, the gear unit is basically developed in square form, so that the front side has an essentially rectangular contour. Fan hood 9 has a rectangular form as well, which preferably is rectangular in principle and in particular has a larger cross-sectional area than fan 5 and the gear unit housing, especially in a plan view according to FIG. 3.

The gear unit housing is indicated by dashed lines in FIG. 3.

The maximum outer diameter of fan 5 is greater than the width of the gear unit housing but smaller than the height of the gear unit housing. In the same way the fan hood is broader than the width of the gear unit housing. Therefore the exit opening between fan 5 and the gear unit housing is large, and in particular, corresponds approximately to the difference between the width of fan hood 9 and the width of the gear unit housing.

To prevent turbulence in the air flow supplied by fan 5, fan hood 9 includes radially aligned and radially extending air baffles 4. The rotational pulse of the supplied air flow is therefore reduced. Each air baffle extends from fan hood to the gear unit housing. The radial extension differs depending on the angle at circumference position of individual air baffle 4. That is to say, air baffles 4 act as anti-turbulence plates for the emerging air flow.

The diameter of fan 5 is smaller than the height of the gear unit housing.

Upper cover plate 10 has a conical shape and the cone tip has been removed. The opening thus produced acts as air intake and has a diameter that is less than or equal to the diameter of the air intake opening provided by separation plate 1.

After air has entered the supply channel, delimited by fan blades 7 of fan 5 in the circumferential direction, the channel cross-section Q2 increases starting from intake cross-section Q1 until emerging flow cross-section Q3 has been reached. The increase in cross-section Q2 is preferably monotonous. The fan therefore operates as a diffuser on the one hand, but there is also a conveyance effect in the radial direction because of the development as a radial fan on the other. A relatively high pressure is therefore generated at a relatively low flow rate.

Lower cover disk 13 is preferably planar, i.e., it extends in the radial direction and in the circumferential direction.

Figure 1:
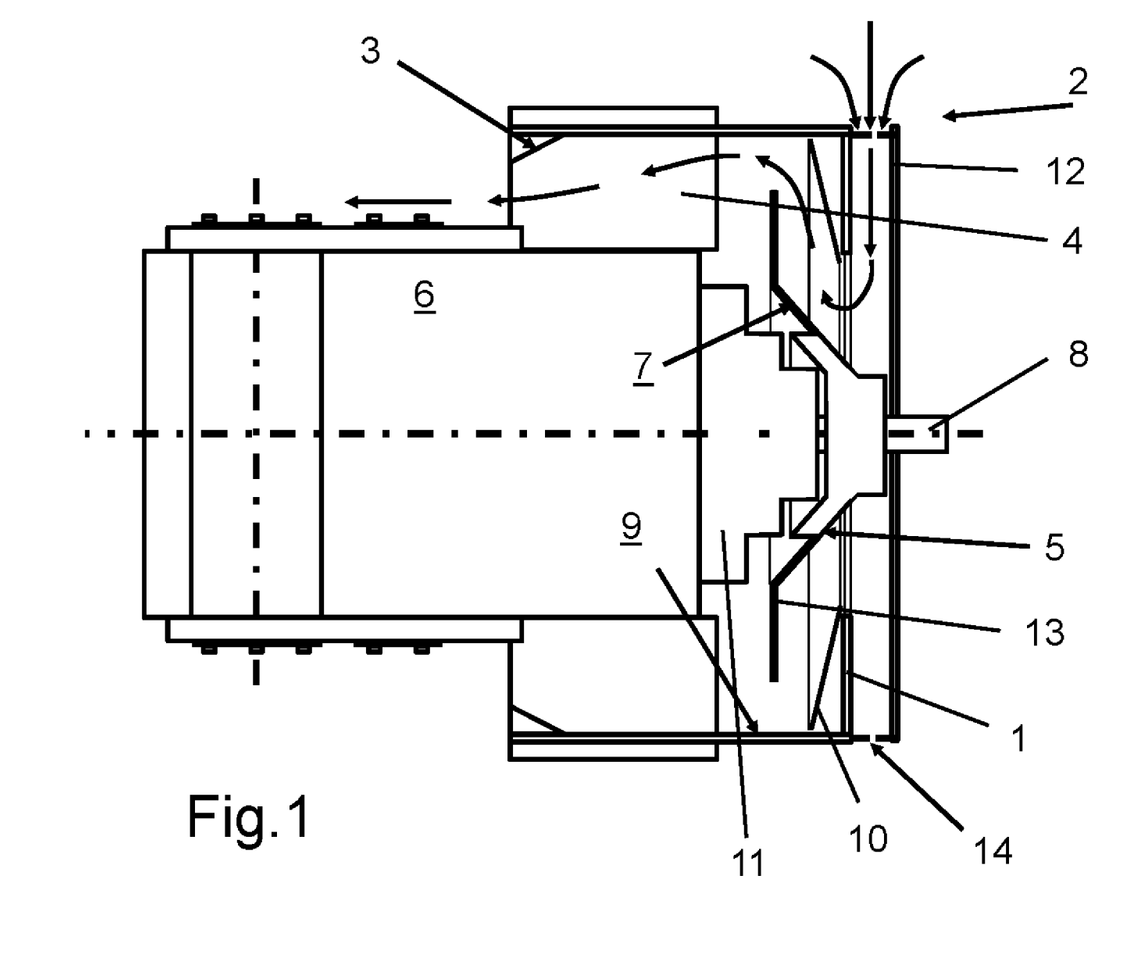
FIG. 1 schematically and in a sectional plan view illustrates a gear unit according to the invention including an attached fan 5.

As illustrated in FIG. 1, the air intake into the region surrounded by fan module 9 takes place from the radial direction, because the associated opening discharges into the environment in the radial direction.

Using cover plate 12, the entering air is guided radially further toward the inside and axially flows into fan 5 in the opening region of separation plate 1. The air flow radially brought out by fan 5 is deflected by fan hood 9. The air flow exits along the gear unit housing in the axial direction. The constriction causes a jet effect in the exit region of fan hood 9 and thus an increase in the flow rate of the emerging air flow.

The radially directed air intake is possible because of cover plate 12. Input shaft 8 thus is connectible to a driving shaft of an electric motor which drives the gear unit.

The axial region covered by fan hood 9 includes the axial region covered by fan blades 7 and, at least partially, the axial region covered by air baffles 4 as well.

Fan hood 12 and separation plate 1 are able to be produced in one piece, especially from sheet metal, especially steel plate. A particularly simple and cost-effective production is achievable by a production as a stamped and bent part. A two-piece development is advantageous as well, especially if smaller production numbers are involved.

As illustrated in FIG. 3, the fan hood has a rectangular cross-section. The normal of the cross-sectional area is aligned parallel to the axis of the input shaft.

To reduce turbulence losses, air baffles 4 are situated at a distance from fan 5.

Air blades 7 are not uniformly spaced apart from one another in the circumferential direction, so that losses, in particular structure-borne noise and airborne noise losses, are able to be reduced. Nine fan blades 7 are preferably provided.

The hub of the fan impeller has a conical design, and the circumference of the hub increases in the flow direction in order to deflect the air in the radial direction.

As illustrated in FIG. 3, six long air baffles 4 extending in the radial direction are provided in the circumferential direction, and two additional short air baffles 40 which extend in the radial direction and are situated in the upper and lower region of fan hood 9 in each case.

The pressure side and the suction side are therefore separated by separation plate 1. The opening disposed in separation plate 1 in the form of a circle has been cut out for the air entry, and the center point of the circle lies on the imaginary axis of the input shaft.

Nozzle 3 can easily be produced by the placement of the rear edge of fan hood 9. The setting features an angle between 10° and 40°.

Cover plate 12 guides the air from radially outside to radially further inside. As a result, any desired attachment may be provided in the axial end region of the input shaft facing away from fan 5 because these attachments, which extend axially farther away from the cover disk and the gear unit, do not affect the air flow to any essential degree because cover plate 12 allows the inflow of the cool ambient air from the radial direction. That is to say, even if the attachments have hot surfaces, no air flow carries heat from the attachments into the fan. In other words, it is therefore possible to place a coupling between the electric drive motor and the gear unit, especially the input shaft of the gear unit. Especially in the case of a fluid coupling disposed on input shaft 8, i.e., a hydraulically operating coupling which has a large extension in the radial direction, the entry of cool air to fan 5 is nevertheless able to be induced by cover plate 12.

Cover plate 12 is connected to fan hood 9 via an interlocking protective housing component 14. Interlocking protective housing component 14 has recesses, which are so small that no adult human finger would fit through them, but which are large enough to let the air flow enter with the least resistance possible.

In addition, cover plate 12 enables an approach of the air from all peripheral angular positions. A uniform distribution is achieved in the process.

Figure 4:
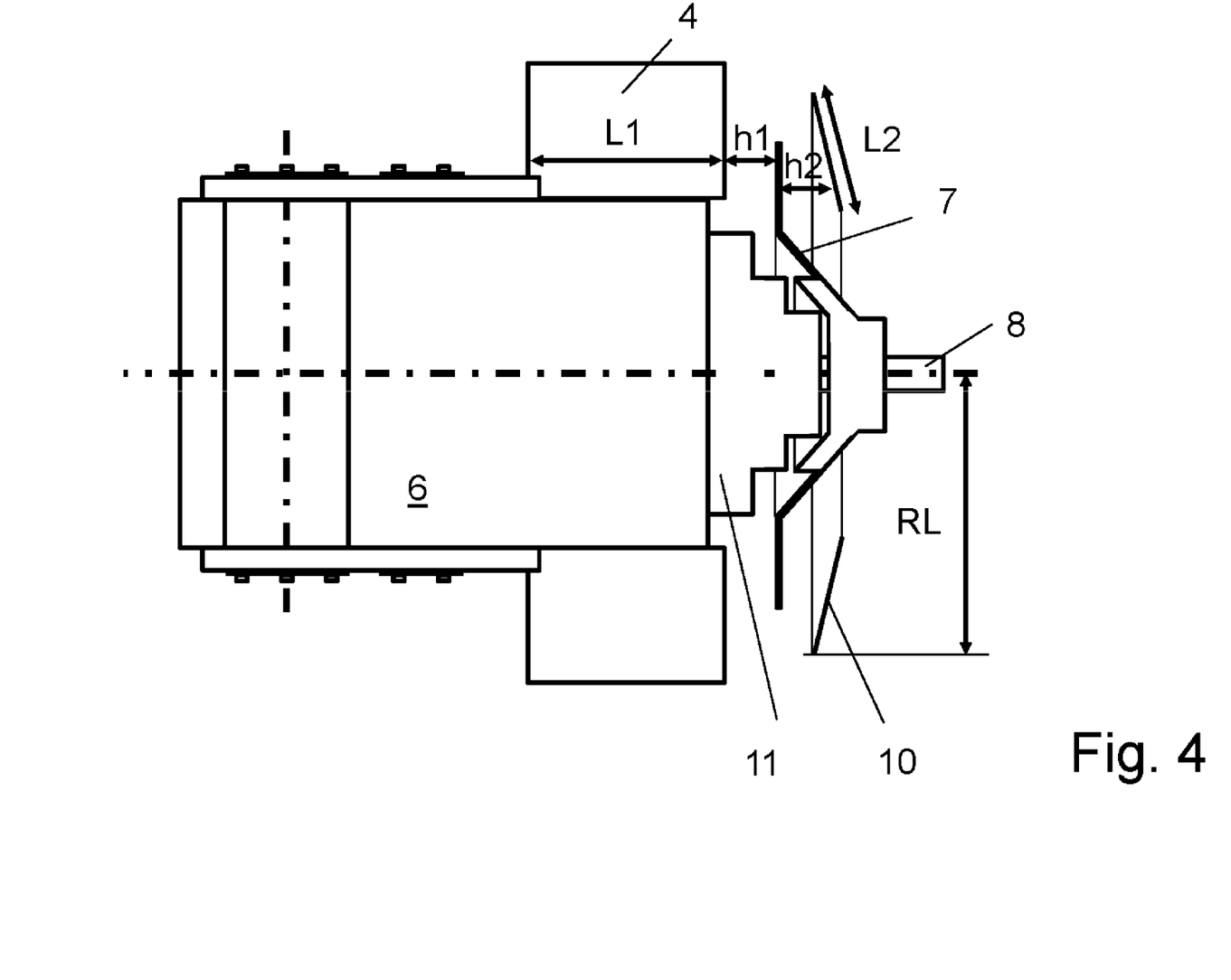
In FIG. 4, the fan hood has been removed in the cross-section according to FIG. 1.
Figure 5:
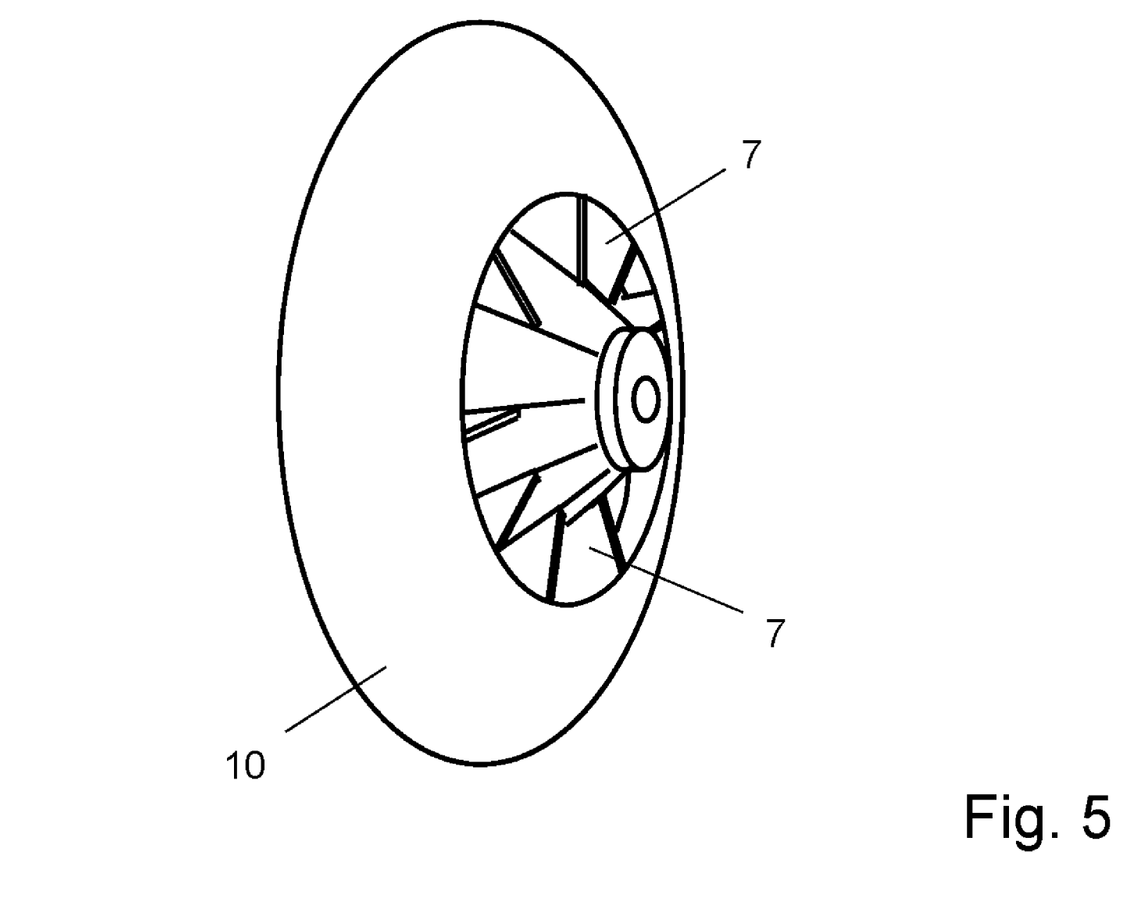
FIG. 5 shows an oblique view of fan 5 from a first direction of view.

Outflow cross-section Q3 is larger than inflow cross-section Q1, preferably 1.1 to 1.3 times larger than inflow cross-section Q1. The vane channel length L2 illustrated in FIG. 4 amounts to between 0.3 to 0.5 times that of fan impeller radius RL. The particular vane channel is delimited by the two most proximate adjacent fan blades 7, at least in the circumferential direction, and in the axial direction by upper cover disk 10 on the one hand, and by lower cover disk 13 on the other.

The separation plate preferably abuts the fan impeller, and a clearance, i.e., a gap, is provided, the gap width of the gap, that is to say, the radial clearance region covered by the gap, being smaller than 10%, especially smaller than 5%, especially smaller than 5% and larger than 0.1%, than the outer diameter of the fan impeller.

Figure 2:
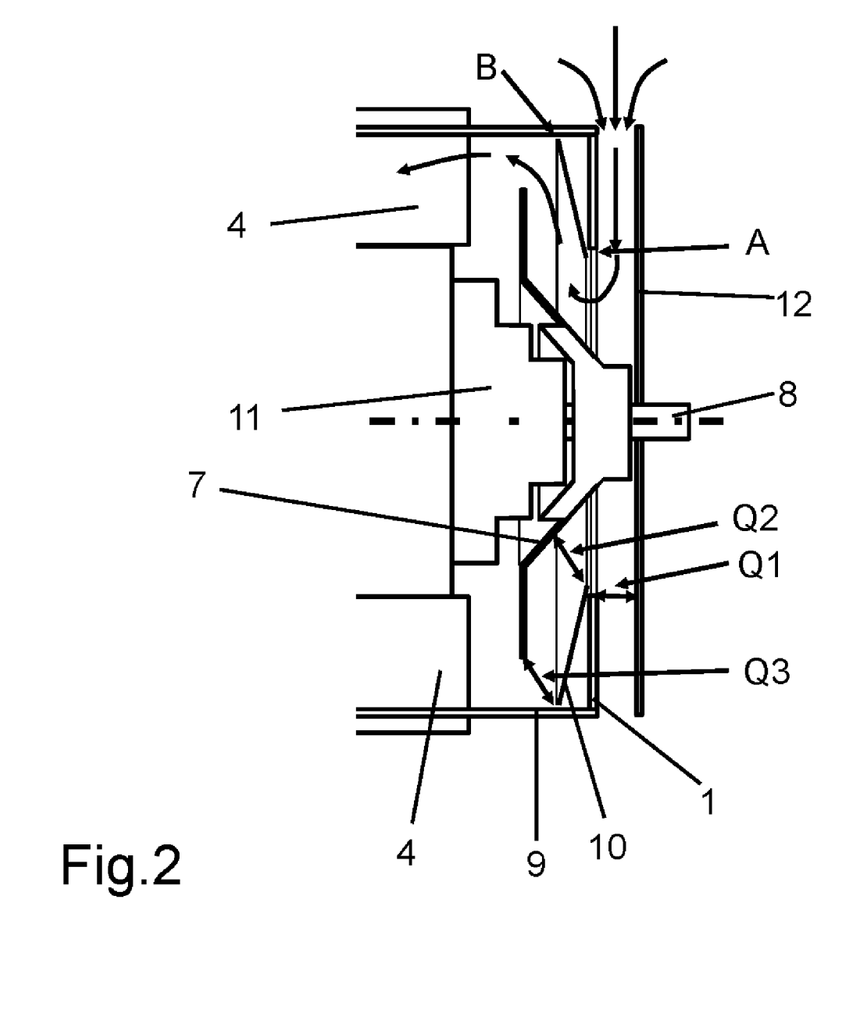
FIG. 2 shows a cut-away portion from FIG. 1 around fan 5.
Figure 7:
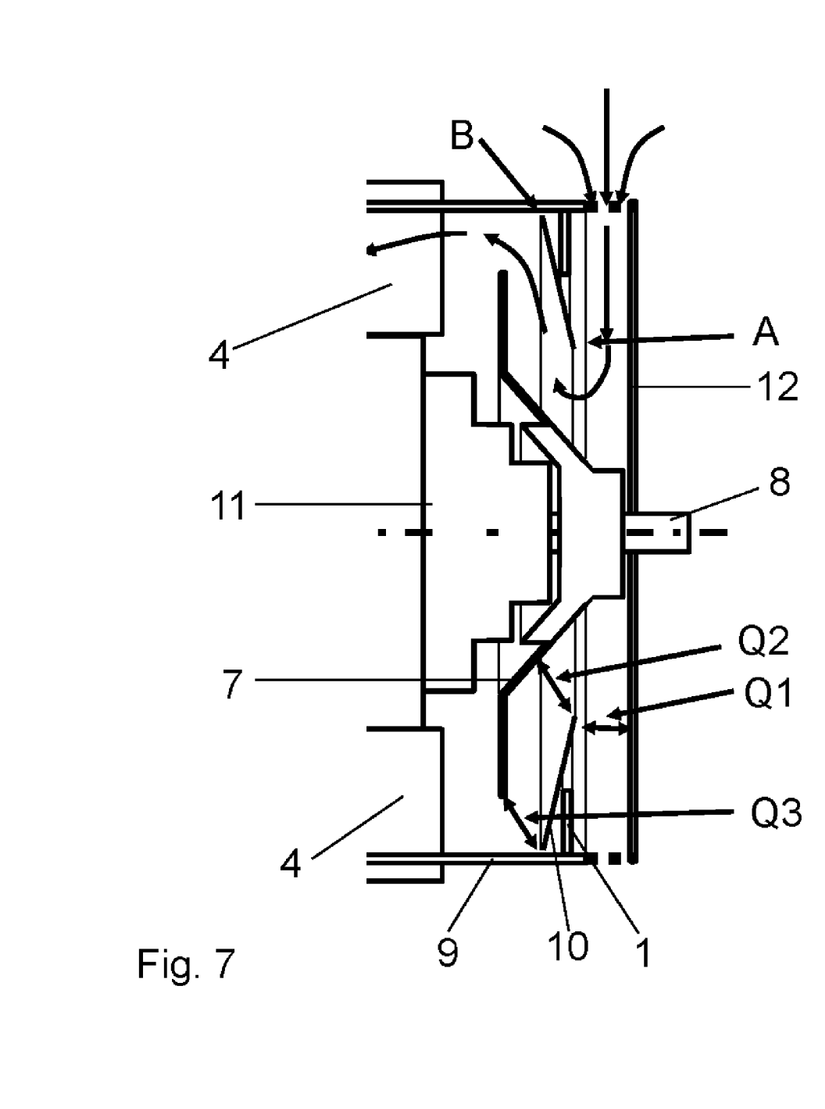
In FIG. 7, in contrast to FIG. 2, separation plate 1 extends radially and axially in the direction of the cover plate in an approximately centrical manner.

As illustrated in the further exemplary embodiment according to FIG. 7, fan 5 has a different design than in FIG. 2. For upper cover disk 10 extends farther in the radially inward direction, and fan 5 then axially projects farther through the recess of separation plate 1. As a result, the axial region covered by fan 5 also covers the axial region of separation plate 1.

In particular, the smallest radial clearance of separation plate 1 is located within the radial clearance region covered by fan 5, especially by its upper cover disk 10.

Furthermore, the axial position of separation plate 1, or the axial region covered by separation plate 1, is located within the axial region covered by fan 5, in particular by its upper cover disk 10.

Preferably, the edge of separation plate 1 that surrounds the air intake opening provided by separation plate 1 is centrally situated in the axial region covered by upper cover disk 10 and centrally in the radial clearance region covered by upper cover disk 10.

In further exemplary embodiments according to the present invention, cover disk 12 is provided with recesses, so that an axial entry of air is made possible in addition.

In additional exemplary embodiments according to the present invention, separation plate 1 is not situated at the inner radius of fan 5 but at the outer radius, in contrast to FIG. 2, and in both cases there is a small clearance in the radial direction between separation plate 1 and fan 5 in order to avoid contact. However, the clearance is selected as small as possible while taking manufacturing tolerances into account, so that the losses by turbulence in the flow, in particular reactive turbulence flows, remain low.

In further exemplary embodiments according to the present invention, separation plate 1 is not developed in one piece with the rest of the fan hood, so that a simple exchange is possible.

LIST OF REFERENCE NUMERALS 1 separation plate
2 air supply region
3 nozzle
4 air baffle
5 fan
6 gear unit
7 fan blade
8 input shaft
9 fan hood
10 upper cover disk
11 conical cup housing
12 cover plate
13 lower cover disk
14 engagement protection housing component
15 edge of gear unit housing
40 air baffle
A opening cross-section
Q1 inflow cross-section
Q2 channel cross-section
Q3 outflow cross-section

The invention claimed is:

1. A gear unit, comprising:
a housing;
a shaft;
a fan including a fan impeller connected to the shaft in a torsionally fixed manner;
a fan hood connected to the housing, the housing at least partially enclosing the fan impeller; and
a separation plate for separating a pressure chamber of the fan from a suction chamber of the fan, the separation plate being connected to the fan hood, wherein:
the separation plate includes an air intake opening for the fan impeller and is situated on a side of the fan impeller facing axially away from the gear unit,
the fan impeller has an upper cover disk and a lower cover disk that are axially set apart from each other,
fan blades of the impeller are disposed between the cover disks, so that channels are formed,
a radial clearance of the air intake opening is disposed within a radial clearance region covered by the upper cover disk,
the air intake opening is disposed axially within an axial region covered by the upper cover disk,
at least one of the cover disks has a conical shape, and
the conically-shaped cover disk extending axially through the air intake opening.

2. The gear unit as recited in claim 1, wherein the shaft is an input shaft.

3. The gear unit as recited in claim 1, wherein:
the fan impeller is a radial fan impeller, and
the fan blades of the fan impeller are spaced apart from each other at irregular intervals in a circumferential direction.

4. The gear unit as recited in claim 1, wherein:
the separation plate abuts the fan impeller, and
a clearance is provided that prevents contact between the separation plate and the fan impeller but does not permit any essential back flow from the pressure chamber into the suction chamber.

5. The gear unit as recited in claim 1, wherein:
the separation plate abuts the fan impeller, and
a gap is provided having a gap width smaller than 10% of an outer diameter of the fan impeller, and larger than 0.1%, of the outer diameter of the fan impeller.

6. The gear unit as recited in claim 1, wherein:
the separation plate abuts the fan impeller, and
a gap is provided having a gap width smaller than 5% of an outer diameter of the fan impeller, and larger than 0.1%, of the outer diameter of the fan impeller.

7. The gear unit as recited in claim 1, wherein at least one of:
at least one of the fan hood and the housing is rectangular, and
an outer diameter of the fan impeller is at least one of:
greater than a width of the gear unit housing, and
smaller than a height of the housing.

8. The gear unit as recited in claim 1, further comprising:
air baffles disposed between the fan hood and the gear unit housing in order to one of prevent and reduce turbulence of an air flow emerging from the fan hood, wherein the air baffles are axially set apart from the fan impeller.

9. The gear unit as recited in claim 8, wherein at least one of:
the air baffles extend radially from the housing to the fan hood,
a channel cross-section increases monotonously from an intake region at the fan impeller, which lies radially farther inward, in a direction of the exit region at the impeller, which lies radially farther outside,
the intake region is implemented at an axial position, the intake region area being an area that extends only radially and in a circumferential direction, and
the exit region is a surface that extends in the radial direction, in the circumferential direction, and in an axial direction.

10. The gear unit as recited in claim 8, wherein each air baffle extends radially from the housing to the fan hood.

11. The gear unit as recited in claim 1, wherein the fan hood includes a nozzle in an air exit region, so that an emerging air flow flows along the housing.

12. The gear unit as recited in claim 1, further comprising:
a cover plate axially set apart from the separation plate, so that an air inflow takes place from a radial direction.

13. The gear unit as recited in claim 12, wherein the cover plate has recesses to allow an additional axially entering air flow.

14. The gear unit as recited in claim 12, further comprising an interlocking protective housing component disposed between the cover plate and the separation plate, and via which the cover plate is retained at the separation plate.

15. The gear unit as recited in claim 1, wherein the separation plate is detachably connected to the fan hood in such a way that fan impellers of different sizes are optionally able to be provided by an exchange of the separation plate.

16. The gear unit as recited in claim 1, wherein at least one of:
a cover plate axially set apart from the separation plate,
the fan hood is configured as a stamped and bent part,
a nozzle is implemented by positioning a fan hood edge in an air exit region, and
a setting angle is between 10° and 40°.

17. The gear unit as recited in claim 1, wherein an outer radius of the fan impeller is larger than a width of the gear unit and smaller than a height of the gear unit.

18. The gear unit as recited in claim 1, wherein:
an outer radius of the fan impeller is smaller than a width of the gear unit and smaller than a height of the gear unit, a radius of an opening of the separation plate being essentially similar to an outer radius of an air intake region, formed by the channels of the fan impeller.

\* \* \* \* \*